(12) United States Patent
Holzapfel

(10) Patent No.: US 10,505,329 B2
(45) Date of Patent: Dec. 10, 2019

(54) METHOD FOR MAKING CONTACT WIRES FOR SLIPRINGS

(71) Applicant: SCHLEIFRING GMBH, Furstenfeldbruck (DE)

(72) Inventor: Christian Holzapfel, Fürstenfeldbruck (DE)

(73) Assignee: SCHLEIFRING GMBH, Fürstenfeldbruck (DE)

( * ) Notice: Subject to any disclaimer, the term of this patent is extended or adjusted under 35 U.S.C. 154(b) by 232 days.

(21) Appl. No.: 15/696,375

(22) Filed: Sep. 6, 2017

(65) Prior Publication Data

US 2018/0069362 A1 Mar. 8, 2018

(30) Foreign Application Priority Data

Sep. 8, 2016 (EP) .................................. 16187824

(51) Int. Cl.
| | |
|---|---|
| *H01R 43/00* | (2006.01) |
| *H01R 39/26* | (2006.01) |
| *H01R 43/10* | (2006.01) |
| *H01R 43/12* | (2006.01) |
| *C25D 15/02* | (2006.01) |
| *H01R 39/10* | (2006.01) |
| *H01R 39/22* | (2006.01) |
| *H01R 39/28* | (2006.01) |

(52) U.S. Cl.
CPC ............ *H01R 39/26* (2013.01); *H01R 43/10* (2013.01); *H01R 43/12* (2013.01); *C25D 15/02* (2013.01); *H01R 39/10* (2013.01); *H01R 39/22* (2013.01); *H01R 39/28* (2013.01); *Y10T 29/49194* (2015.01)

(58) Field of Classification Search
CPC .............. Y10T 29/49; Y10T 29/49194; B23K 2101/32; C23C 16/00; C23C 18/32; H01B 13/0016; H01B 1/02; H01R 43/28
USPC ........................... 29/868, 417, 745, 825, 828
See application file for complete search history.

(56) References Cited

U.S. PATENT DOCUMENTS

| | | | |
|---|---|---|---|
| 2,036,034 | A | 3/1936 | Fulmer et al. |
| 3,158,258 | A | 11/1964 | Kelday |
| (Continued) | | | |

FOREIGN PATENT DOCUMENTS

| | | |
|---|---|---|
| CN | 202076657 U | 12/2011 |
| CN | 103579878 A | 2/2014 |
| (Continued) | | |

OTHER PUBLICATIONS

Office Action issued in related Chinese Patent Application No. 20171080335.4, dated Jul. 2, 2019, 5 pages.

*Primary Examiner* — Thiem D Phan
(74) *Attorney, Agent, or Firm* — Quarles & Brady LLP; Yakov S. Sidorin

(57) ABSTRACT

A method for making contact wires for sliprings comprising the steps of: coating and/or plating a wire with a first metal of the group of nickel, chrome or a combination thereof; coating and/or plating the wire with a second metal of the group of gold, silver, or a combination thereof; delivering laser radiation and generating an interference pattern of the laser radiation to the surface of the wire; heating the surface selectively as defined by the interference pattern, modifying of the crystal structure and/or providing protrusions and/or recesses due to melting and/or evaporation of the surface material.

10 Claims, 8 Drawing Sheets

(56) References Cited

U.S. PATENT DOCUMENTS

| | | | | |
|---|---|---|---|---|
| 5,151,147 A | * | 9/1992 | Foster | B29C 48/30 156/244.12 |
| 7,617,847 B1 | * | 11/2009 | Clerkin | B21C 3/08 140/139 |

FOREIGN PATENT DOCUMENTS

| | | |
|---|---|---|
| CN | 205231435 U | 5/2016 |
| DE | 102011051804 A1 | 1/2013 |
| DE | 202015101280 | 7/2016 |
| EP | 2838166 A1 | 2/2015 |
| GB | 1405953 | 9/1975 |
| WO | 2014183798 A1 | 11/2014 |

\* cited by examiner

METHOD FOR MAKING CONTACT WIRES FOR SLIPRINGS

CROSS-REFERENCE TO RELATED APPLICATIONS

This application claims priority from pending European Application No. 16187824.4 filed on Sep. 8, 2016, the disclosure of which is incorporated herein by reference.

BACKGROUND

1. Field of the Invention

The invention relates to sliprings for transmission of electrical signals between rotating parts. Specifically, it relates to brushes and wires, of sliprings, having a surface configured to improve contact characteristics and lifetime.

2. Description of Relevant Art

Electrical sliprings are used to transfer electrical power and/or signals between a rotating and a stationary part. Such devices are used in different applications, for example wind energy plants or computer tomography scanners. There also exist several military and aerospace applications.

It is common to the use of sliprings in all of these applications, that a high lifetime and a low contact resistance as well as a low contact noise are required from the sliprings.

Sliprings generally include a first part, having sliding tracks, and a second part, having brushes for sliding on the sliding tracks. Due to the mechanical friction between the brushes and the sliding tracks there is wear, which causes the slipring to degrade over time.

EP 0662736 A discloses a slipring assembly, where a single brush has several wires that run in a V-groove. This leads to a lower contact resistance due to several electrical contacts being connected in parallel.

U.S. Pat. No. 4,398,113 A discloses another slipring assembly with brushes having a plurality of finest wires. Again, the multiple contacts lead to a relatively low contact resistance.

SUMMARY

The embodiments are directed to designing such a slipring, a slipring brush block, and a brush that will ensure reliable electrical contact with a high service life time and high reliability. The embodiments should be able to transfer high currents while having a comparatively small size. Production of the embodiments should be simple and carried out at low costs.

In a slipring, the electrical contact is established between a cylindrical drum (having sliding tracks arranged in an axial direction) or a disk (having sliding tracks with different diameters arranged radially), and a contacting wire or a plurality of contacting wires referred to as a brush. Here, the reference is made to a wire, with understanding that a brush may be formed by a plurality of such wires that are electrically connected together and that may be mechanically held together, or, alternatively or in addition, which may separately be held such that they contact at least a sliding track.

For achieving good electrical contact, low contact resistance, low contact noise, and high current transfer characteristics in addition with a long lifetime and low wear, the material properties of the brush have to be adapted to the sliding track. To obtain a good electrical contact, a comparatively complex brush may be used. Such a brush may have a core of a spring-elastic material (such as steel of even spring steel, or brass, or similar material). This core may have at least one or multiple layers, which may be obtained by coating, plating, electroplating, or a similar process. Preferably, on the core there is at least one inner layer made of a comparatively hard metal, preferably nickel or a combination of nickel with other metals. To obtain good electrical characteristics, there is also preferably at least one outer layer comprising silver, gold, any other good electrically-contacting material or a combination thereof.

For best contacting properties, the surface structure may be optimized.

In a first embodiment, a predetermined surface structure is formed at at least parts of a brush wire. Such a surface structure may have a certain surface roughness (defined by an amplitude between a maximum valley depth and a maximum peak height, thus defining an RZ value). The roughness may also be defined by an arithmetical mean roughness, which may be given by an RA value. Preferably, the surface may have a surface structure defined by a grid, notches, and/or a polygonal pattern, Preferably, the RZ value is in a range of 0.1 µm to 2 µm, most preferably between 0.5 µm to 1.8 µm. These values should be regarded as guidelines for fabrication of the embodiment. In practice, the 3D surface structure with "valleys" and "hills/ridges" is important, since the valleys do act as micro reservoirs for lubrication material (in cases when liquid lubrication is being used), whereas the hills or ridges are mainly important for establishing the detailed mechanical contact properties. The ridges will be deformed elastically and plastically during the process of sliding of a brush wire and, therefore, are mainly responsible for friction properties as well as evolution of wear of the brush wire. This is especially significant during early sliding (running-in-stage, where material transfer between brush wire and track can occur. Even if the initial surface structure is lost or modified during the sliding, the resulting new contact configuration during running-in mainly determines the tribological evolution of the system. Therefore, even after the surface structure loss/modification there is an effective "memory" of the system that still imprints the influence of the starting, initially-existing structure on the sliding properties. For example, for typical sliding distances representative for fretting (on the scale of meters maximum) the surface structure of the brush wire might survive. For typical sliding distances over the lifetime of slip rings (>>1 km, typically on the order of 10,000 km), the aforementioned memory effect has been confirmed in experiments.

Such a surface structure may cover the whole brush wire, or it may only be formed to cover a specific section of the brush wire. In a preferred embodiment of a contact wire with a circular cross-section, the surface structure may subtend an angle of less than 180 degrees of the wire (as seen from the axis of the wire, for example), as the contact wire never contacts a sliding track with its full outer surface. The contact surface is practically always limited to a small (smaller than full or complete) surface area. Therefore, it is preferred to limit the surface area of the wire that is occupied by the structure, in order to reduce manufacturing costs. In one embodiment, the section is further limited, for example by limiting the angle subtended by the surface structure (as viewed from the axis of the wire) to less than 90 degrees, or even less than 60 degrees, or even less than 45 degrees. In a related case, there may also be two or more sections with a surface structure, which sections are angularly separated (are at an angular distance) from each other. Such configurations may be useful when running a sliding wire at a V-shaped sliding track that provides two contacting points. Furthermore, the surface structure may be limited to a certain angularly-defined area along a certain limited length of the wire, as a contact wire does not typically contact a sliding track over its whole length. Such area limitation may also be combined with the angular limitation(s) described above.

Structuring of a surface of the wire may be made at an inner layer of a multiple-layer structure. As this inner layer will be further covered by an outer layer at a later stage of the fabrication, it is preferred to have a geometrically-deeper, more pronounced structuring of the relief formed at the inner layer to achieve the desired structure depths at the outermost surface, as mentioned above. Alternatively, structuring may be applied to the outer layer of the multiple-layer structure. A combined structuring of the inner layer and the outer layer, at the same time, is within the scope of the invention. Such combined structuring would allow to achieve a diverse combination of different structures.

Another embodiment of the invention represents a method for structuring a contact wire by using a structured drawing die. Wires are manufactured by pulling a wire through a drawing die, thus reducing the initial diameter of the wire by a small amount. This process may be repeated multiple times to generate the desired wire diameter by using multiple drawing dies with decreasing diameter. Normally and conventionally, drawing dies have a polished inner surface to reduce the forces required for drawing and to obtain a smooth wire surface at the output of the die. According to the idea of the invention, it is preferred to have a structured drawing die instead. A so-structured drawing die may have a plurality of grooves, the use of which may result in a wire having a corresponding plurality of grooves on its outer surface. Such grooves may be oriented parallel to a center axis of the wire, or, alternatively or in addition, they may be oriented at an angle to the center axis to generate a spiral-shaped groove or a plurality of spiral-shaped grooves at the wire surface.

A further preferred method for structuring a contact wire employs structuring with the use of laser-light interference. Laser-light interference structuring may provide many small patterns or structures at the surface of a wire. For laser-light interference structuring, two coherent laser beams are used to irradiate the surface of a wire and to generate an interference pattern at such surface, thus melting or evaporating specific surface section(s) of the wire. It may also be sufficient for structuring to modify the crystal structure of the wire material by generating a spatially-patterned distribution of heat.

A further embodiment relates to a brush block comprising an insulating body that holds at least one contact wire having a structured surface.

Another embodiment relates to a slipring having a slipring module and a brush block that includes at least one contact wire with a structured surface.

Another embodiment relates to a method for manufacturing a contact wire for sliprings by pulling a wire through a structured drawing die. The drawing die has protrusions and/or recesses to form a structure in a wire being pulled through such drawing die.

A further embodiment relates to a method for laser structuring a contact wire for a slipring by generating an interfering laser-light pattern at the surface of the contact wire. Such laser-light pattern may cover only sections of the length and/or radial sections of a circular contact wire and/or other sections of a contact wire having any other shape. Laser-based structuring may be done after a first step of coating or plating or electro-plating a wire with a metal layer (which may be a hard metal, like nickel or chromium or a combination thereof, and/or a metal layer having good electrical contacts, like gold, silver, or a combination thereof with other metals). In a related embodiment, a contact wire may be coated, plated, or electro-plated by a metal having good electrical characteristics, like gold, silver, or a combination thereof with other metals.

A further embodiment relates to a device configured to structure the surface of a contact wire. The device comprises a laser capable of generating a laser beam, which preferably is split into at least two partial laser beams, for example by a splitter or a mirror. There are additional optical elements such as mirrors and/or lenses for guiding and/or collimating and/or focusing the partial laser beams into a focus spot, where the partial beams can interfere. There are further means added to the device, for holding and/or transporting a brush wire in to the area of the focus spot, such that the laser beams can interfere with the surface of the contact wire. There may be additionally present transport means for transporting the contact wire. There may furthermore be present control means for controlling intensity and/or time of exposure of the wire to laser light. This means may be configured to allow the laser to generate laser pulses, for example, thus generating a sequence of laser-light patterns at the surface of a contact wire. The contact wire may either be continuously transported or may be transported in discrete steps, such that the laser treatment may produce structured surface sections (which section may be distant from each other, form a closed surface area).

BRIEF DESCRIPTION OF THE DRAWINGS

In the following, the invention will be described by way of examples, and without limitation of the general inventive concept, based on embodiments and with reference to the drawings.

Figure 1:
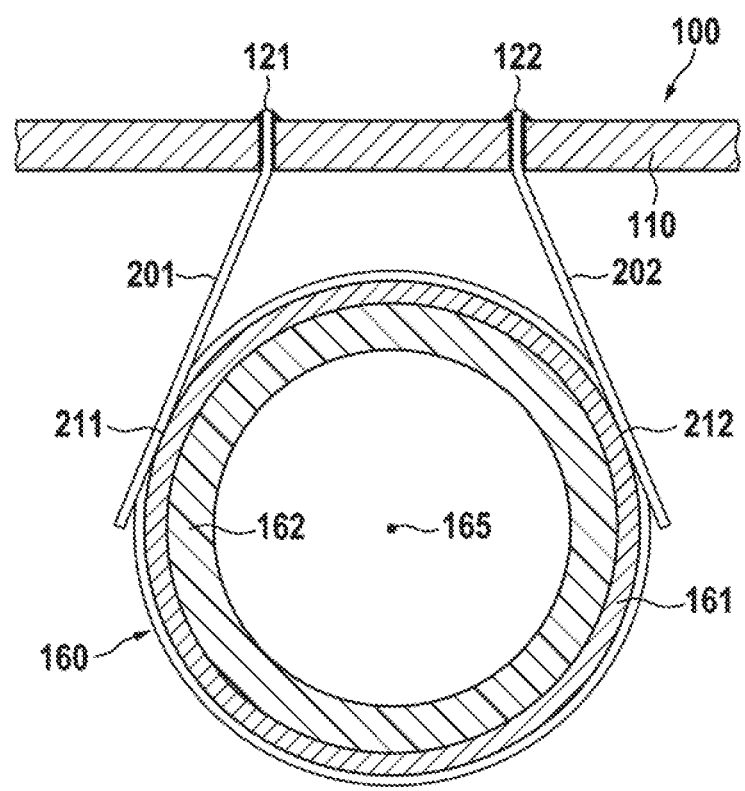
FIG. 1 shows a basic slipring.

While various modifications and alternative forms of implementation of the idea of the invention are within the scope of the invention, specific embodiments thereof are shown by way of example in the drawings and are described below in detail. It should be understood, however, that the drawings and related detailed description are not intended to limit the implementation of the idea if the invention to any particular form disclosed in this application, but on the contrary, the intention is to cover all modifications, equivalents and alternatives falling within the spirit and scope of the present invention as defined by the appended claims.

DETAILED DESCRIPTION

In FIG. 1, a basic slipring is shown. It comprises a cylindrical module 160 having at least one sliding track 161 of a conductive material such as metal, which is supported by an insulating body 162 (preferably made of a plastic material). The module is rotatable about a center axis 165. There may be present a stationary brush block 100, which comprises an insulating body 110 holding at least one contact wire 201, 202. The contact wires may be soldered by soldering connections 121, 122 into through-holes of the insulating body 110. The contact wires have corresponding contact areas 211, 212, at which they contact the module 160.

Figure 2:
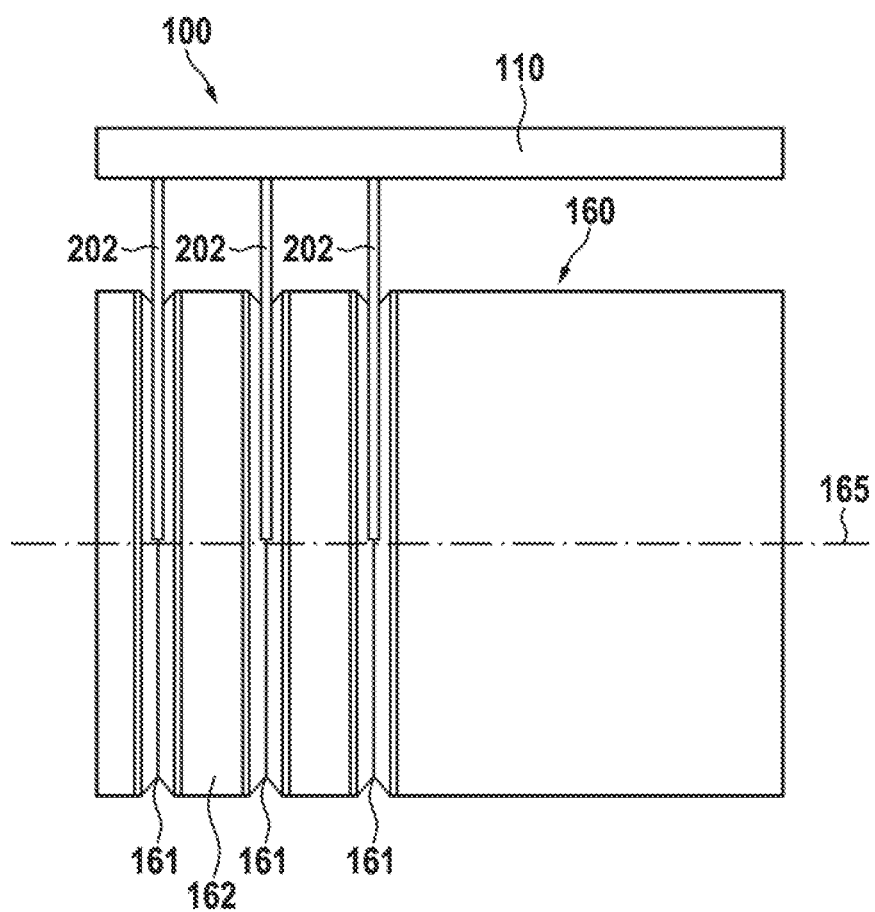
FIG. 2 shows a side view of a slipring.

In FIG. 2, the slipring is shown in a side view. The cylindrical module shows sliding tracks 161 spaced apart by insulating body 162. The sliding tracks 161 have V-shaped grooves for guiding the contact wires. In this Figure, three sliding tracks 161 isolated from each other are shown together with corresponding brushes 202, which are also isolated from each other, thus allowing simultaneous transfer of three signals or three current paths over the slipring.

In FIGS. 3, 4, 5, 6, 7, 8, 9, and 10, different embodiments of wire structures are shown. As mentioned above, a contact wire 201, 202 preferably has a predetermined surface structure.

Figure 3:
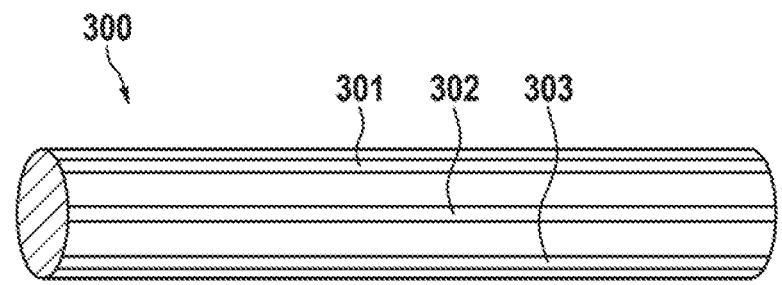
FIGS. 3, 4, 5, 6, 7, 8, 9, and 10 show different embodiments of wire structures.

FIG. 3 illustrates a first embodiment of a contact wire 300 having first linear structures 301, 302, 303. These structures may be formed by recesses and/or protrusions, which may preferably be generated with the use of a drawing die.

Figure 4:
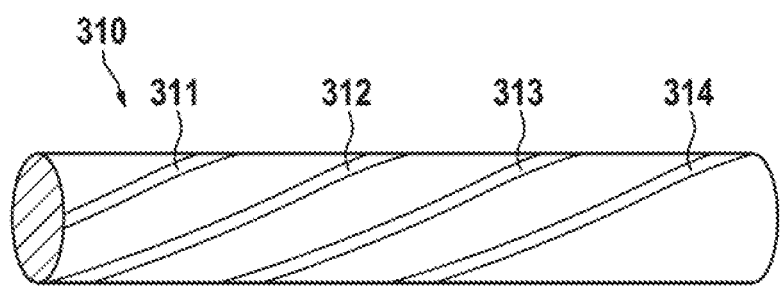

FIG. 4 shows a second embodiment of a contact wire 310 having spiral structures 311, 312, 313, 314. These structures may be formed by recesses and/or protrusions, which may preferably be generated with the use of a drawing die.

Figure 5:
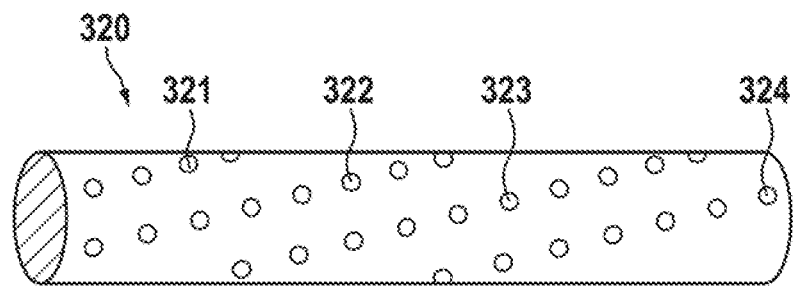

FIG. 5 shows a third embodiment of a contact wire 320 having dotted structures 321, 322, 323, 324. These structures may also be formed recesses and/or protrusions.

Figure 6:

FIG. 6 shows a fourth embodiment of a contact wire 330 having fine linear structures 331. These structures may be recesses or protrusions, which may preferably be made with a drawing die.

Figure 7:
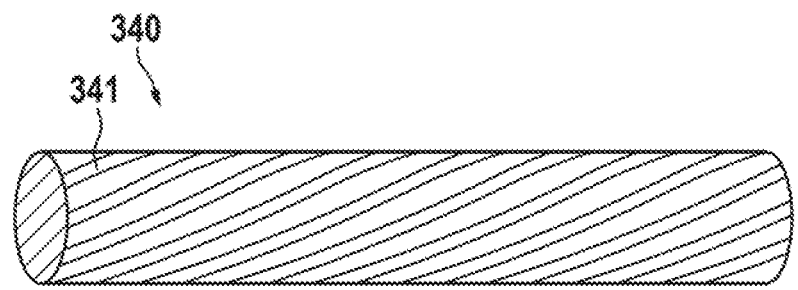

FIG. 7 shows a fifth embodiment of a contact wire 340 having fine spiral structures 341. These structures may be recesses and/or protrusions, which may preferably be made by a drawing die.

Figure 8:
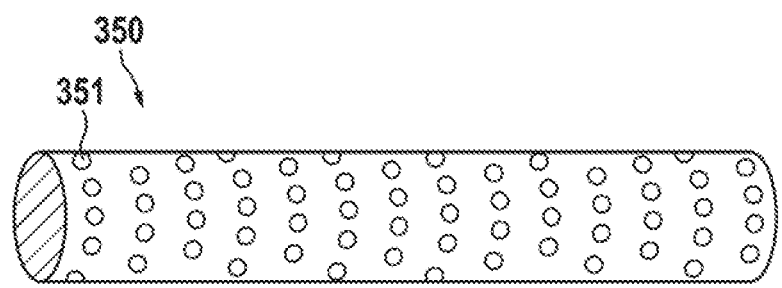

FIG. 8 shows a sixth embodiment of a contact wire 350 having fine dotted structures 351. These structures may be recesses and/or protrusions.

Specifically for manufacturing the embodiments of FIGS. 3, 4, 6, and 7, a structured drawing die may be used. Such a drawing die may have protrusions and/or recesses defining the surface structure of the wire during the process of fabrication of the wire with the use of the drawing die.

Figure 9:
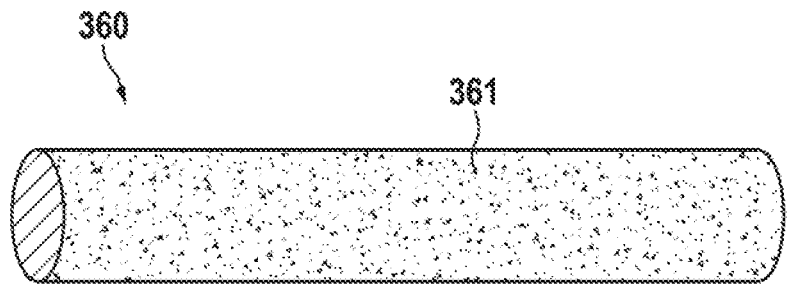

FIG. 9 shows a further embodiment of a contact wire 360 having a micro-pattern 361 which may be made by laser interference structuring. In this embodiment, the pattern is provided at the whole surface of the wire.

Figure 10:
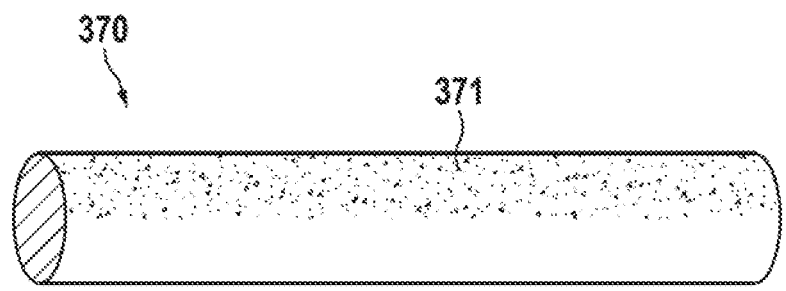

FIG. 10 shows a further embodiment of a contact wire 370 having micro-structures 371 at a section of the surface of the wire. As a contact wire does not contact a sliding track over its whole surface, it may be sufficient to provide a surface structure only at parts of the contact wire. This may furthermore simplify the process of laser structuring.

Figure 11:
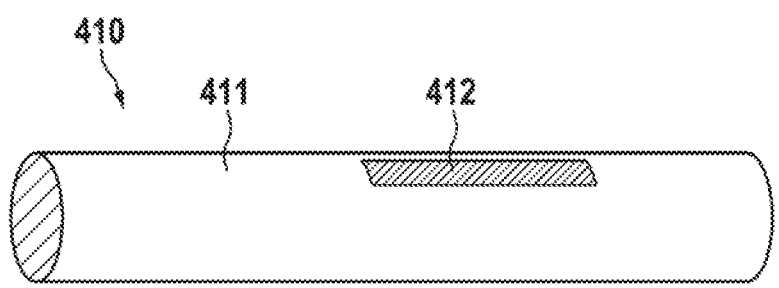
FIG. 11 is a sectional view of a contact wire having a partially structured surface.

FIG. 11 illustrates the case of partial structuring of a contact wire 410, which has a wire body 411 and only a partial structure in a limited surface area 412. It is not necessary to provide structuring over the whole length of the contact wire, as it only stays in contact with the sliding track over a small section of its length. According to the idea of the invention, it is preferred to provide a structured surface only over a wire length in a range of 1 mm to 20 mm, most preferably in a range between 5 mm and 10 mm.

Figure 12:
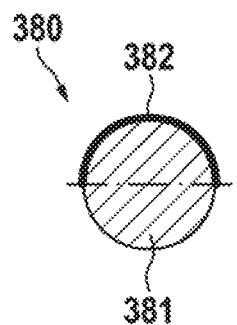
FIG. 12 is a sectional view of another contact wire having a partially structured surface.

In FIG. 12, a cross-sectional view of a contact wire having a partially structured surface is shown. A contact wire 380 comprises core material 381, which may be based on steel or brass material. It furthermore has a surface section 382 of about half the circumference harnessed with the surface structure (that in this case subtends an angle of about 180 degrees, as viewed from the center axis of the wire).

Figure 13:
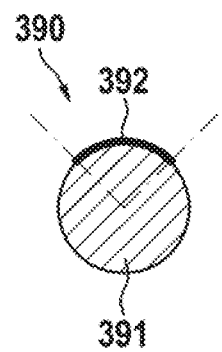
FIG. 13 is a sectional view of another contact wire having a partially structured surface.

In FIG. 13, a sectional view of a contact wire having a partially structured surface is shown. A contact wire 390 comprises core material 391, which may be based on steel or brass material. It furthermore has a 90 degree section 392 of the circumference provided with the structure.

Figure 14:
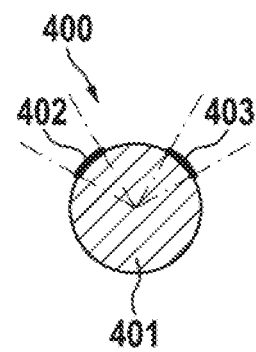
FIG. 14 shows a sliding brush with a sectioned surface running on a V-shaped sliding track.

In FIG. 14, a sectional view of a contact wire having a partially structured surface is shown. A contact wire 400 comprises core material 401, which may be based on steel or brass material. It furthermore has multiple (as shown—two) sections 402, 403, each subtending a respectively-corresponding angle (as viewed from the center axis of the wire) of the circumference (as shown—45 degrees for each of the sections) and provided with the surface structure. It is these surface-structured sections of the wire that are preferably used in practice for operation with a V-shaped sliding track.

Figure 15:
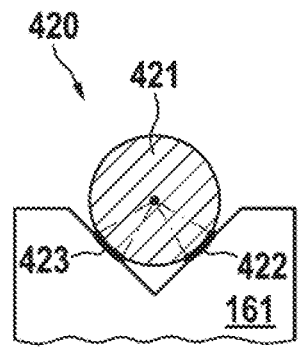
FIG. 15 presents details of a section of a contact brush.

In FIG. 15, a sliding brush with a sectioned surface running on a V-shaped sliding track is shown. The sliding brush 420 is guided in a V-shaped groove of a sliding track 161, forming two separate contact areas. The surface of the brush wire core 421 has two structured areas 422, 423, which are located at the contact points between the wire brush 420 and the sliding track 161.

Figure 16:
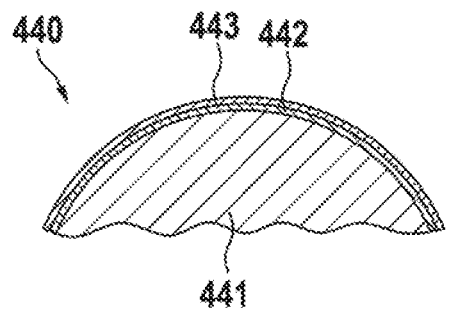
FIG. 16 shows a partial structuring of a contact wire.

In FIG. 16, details of a section of a contact brush 440 are shown. The brush has a brush core 441 (which may comprise steel, brass, or any other metal or a combination thereof providing a comparatively stiff but spring-elastic structure). There are preferably at least two surface layers. Preferably, there is an inner layer 442, which comprises a hard metal like nickel. As shown, there is an outer layer 443, which comprises a material or metal having good electrical-contact characteristics, such as silver or gold, or a combination thereof. The inner and outer layers may be manufactured by coating or plating (preferably by electro-plating). The inner and/or outer layer may be structured as discussed above.

Figure 17:
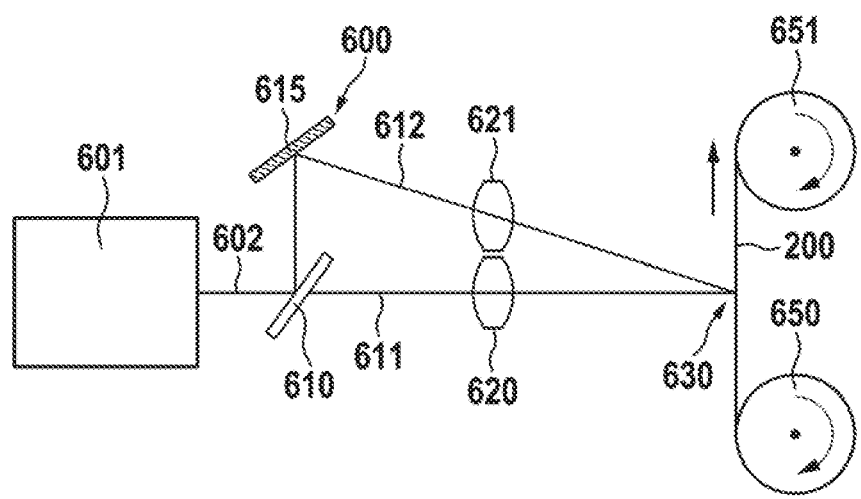
FIG. 17 illustrates a device configured for laser-based structuring of contact wires

FIG. 17 discloses a device configured to effectuare laser-based structuring of contact wires. A laser 601 provides, in operation, a laser beam 602, which is further split with a splitting mirror 610 into at least two preferably equal (irradiance and/or other characteristic-wise) beams 611, 612. The second partial beam 612 is shown to be deflected by a mirror 615 such that the second partial beam and the first partial beam are both directed towards a focus spot 630. Additional lenses 620, 621 are optionally employed for focusing and/or collimating the first and the second laser beams 611, 612. In operation of the device, a contact wire 200 is moved along the area of the focus spot 630. This may be effectuated with a first spool 650 (storing unstructured wire) and a second spool 651 (for storing the already-structured wire). Both spools may be rotated, such that the wire is moved continuously and/or stepwise from one spool to another. There may be further guide rollers which are not shown in-here, or other guiding means for precisely guiding the contact wire at the focus spot. There may be further means for cutting the structured contact wire into pieces and moving these pieces to a container or mounting them directly into brush blocks.

Figure 18:
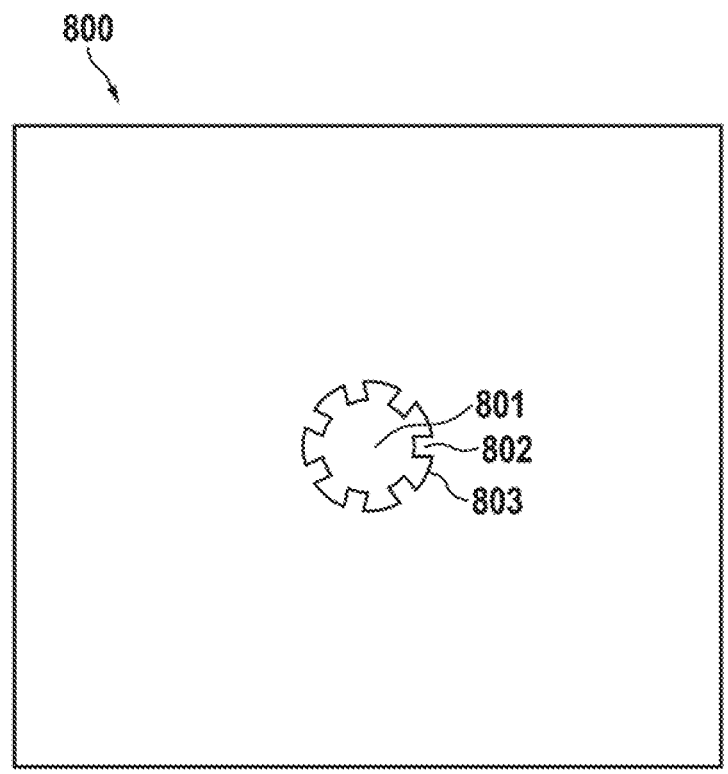
FIG. 18 shows a drawing die in a front view.

FIG. 18 shows a drawing die 800 in a front view. The drawing die 800 has an inner opening 801 through which a wire is pulled. The inner opening has a structured contour providing protrusions 802 and recesses 803, thereby in operation producing a structured surface of a wire when it is pulled through the die.

It will be appreciated by those skilled in the art having the benefit of this disclosure that implementations of this invention are directed to provide structured wires for sliprings and a method for manufacturing of such wires. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 brush block
110 insulating body
121 soldering connection
122 soldering connection
160 slipring module
161 sliding track
162 insulating body
165 center axis
201 contact wire
202 contact wire
211 contact area
212 contact area
300 first contact wire embodiment
301, 302, 303 linear structures
310 second contact wire embodiment
311, 312, 313, 314 spiral structures
320 third contact wire embodiment
321, 322, 323, 324 spiral dots
330 fourth contact wire embodiment
331 fine linear structures
340 fifth contact wire embodiment
341 fine spiral structures
350 sixth contact wire embodiment
351 fine dotted structures
360 seventh contact wire embodiment
361 micropattern
370 eighth contact wire embodiment
371 microstructures
380 contact wire embodiment
381 core material
382 half circumference section
390 contact wire embodiment
391 core material
392 90 degree section
400 contact wire embodiment
401 core material
402, 403 45 degrees sections
410 contact wire
411 wire body
412 structured area
420 sliding brush
421 contact wire core
422, 423 structured areas
440 contact brush
441 brush core
442 inner layer
443 outer layer
601 laser
602 laser beam
610 splitting mirror
611 first partial beam
612 second partial beam
615 mirror
620 first beam lens
621 second beam lens
630 focus spot
650 spool storing unstructured wire
651 spool storing structured wire
800 drawing die
801 inner opening
802 protrusions
803 recesses

What is claimed is:

1. A method for making contact wires for sliprings, the method comprising the steps of:

a. processing a wire by at least one of (i) coating and (ii) plating the wire with a first metal comprising at least one of nickel and chrome;

b. processing the wire by at least one of (a) coating and (b) plating the wire with a second metal comprising gold and silver;

c. delivering laser radiation to an outer surface of the wire to generate an interference pattern of the laser radiation thereon;

d. heating the outer surface selectively as defined by the interference pattern; and e. carrying out at least one of (i) modifying a crystal structure of a surface material, (ii) providing at least one of protrusions and recesses at the outer surface of the wire caused by at least one of melting and evaporation of the surface material.

2. The method according to claim 1, wherein step e. is effectuated by selectively applying the laser radiation to predetermined sections of the outer surface of the wire.

3. The method according to claim 1, wherein steps c., d., and e. are carried out before any of steps a. and b.

4. The method according to claim 1, wherein steps c., d., and e. are carried out after any of steps a. and b.

5. The method of claim 1, wherein performing step e. includes providing the at least one of said protrusions and recesses to define a surface roughness between 0.1 µm and 2 µm.

6. The method of claim 1, wherein performing step e. includes providing the at least one of said protrusions and recesses in an area, of said outer surface, that subtends an angle less than 180 degrees as viewed from an axis of the wire to define a portion of said outer surface along which the wire contacts a surface of a slipring in operation.

7. The method of claim 1, wherein performing step e. includes providing the at least one of said protrusions and recesses in at least two sections on said outer surface.

8. The method of claim 7, wherein performing step e. further includes forming a first section of the at least two sections to be angularly separated from a second section of the at least two sections, as viewed from an axis of the wire.

9. The method of claim 1, comprising modifying a surface of an inner layer of a multilayer structure on a wire.

10. The method of claim 9, comprising structuring the surface of the inner layer and a surface of an outer layer of said multilayered structure.

\* \* \* \* \*

UNITED STATES PATENT AND TRADEMARK OFFICE
CERTIFICATE OF CORRECTION

PATENT NO. : 10,505,329 B2
APPLICATION NO. : 15/696375
DATED : December 10, 2019
INVENTOR(S) : Christian Holzapfel Page 1 of 1

It is certified that error appears in the above-identified patent and that said Letters Patent is hereby corrected as shown below:

On the Title Page

"Applicant: SCHLEIFRING GMBH
　　　　Furstenfeldbruck (DE)"
Should read:
-- Applicant: SCHLEIFRING GMBH
　　　　Fürstenfelbruck (DE) --

Signed and Sealed this
Third Day of March, 2020

Andrei Iancu
*Director of the United States Patent and Trademark Office*